Nov. 3, 1936.    R. FERBER    2,059,633
APPARATUS FOR PRODUCING PLANS OF GROUND EXCLUSIVELY BY PHOTOGRAPHIC MEANS
Filed Jan. 10, 1934    2 Sheets-Sheet 1
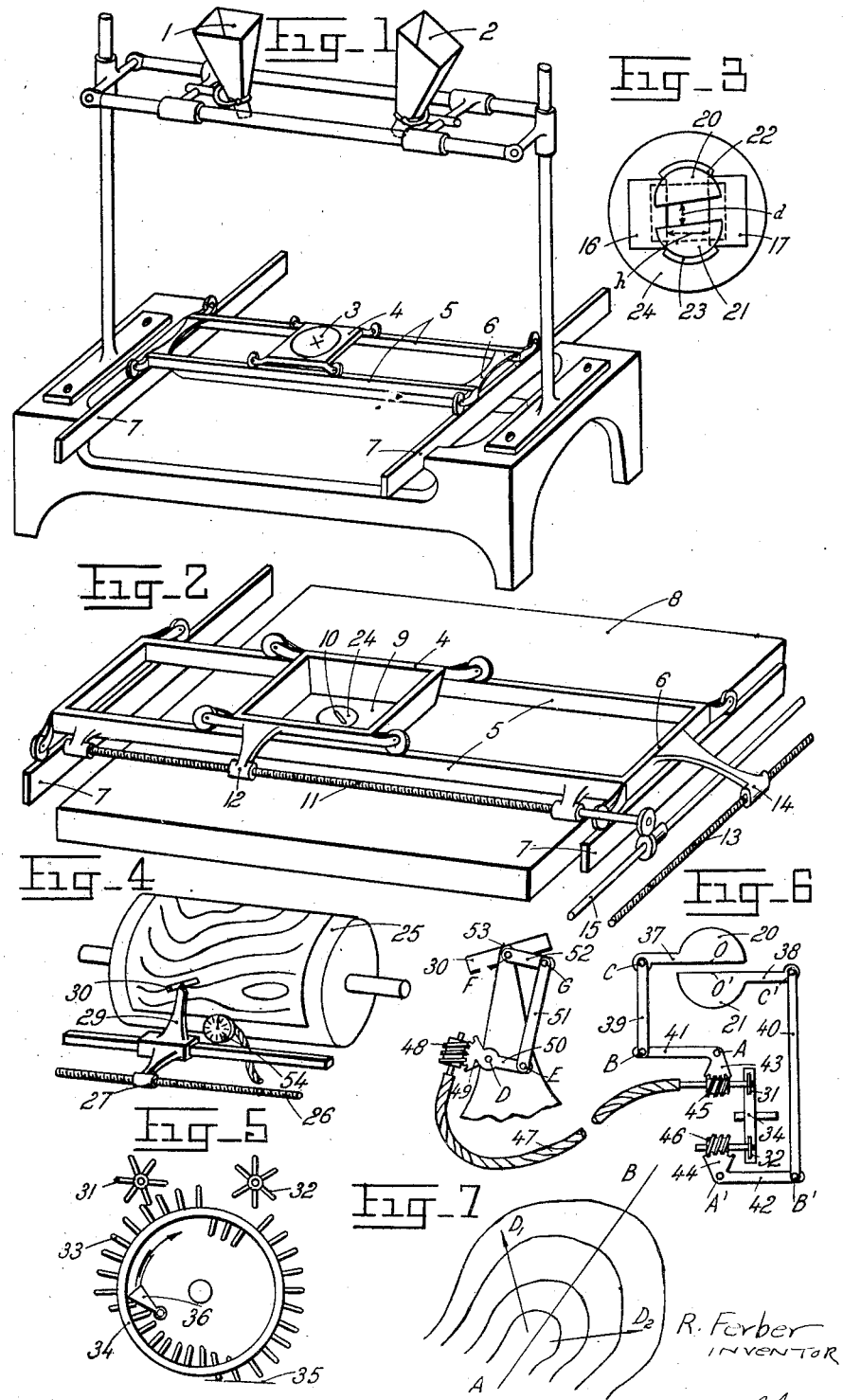

Nov. 3, 1936.  R. FERBER  2,059,633
APPARATUS FOR PRODUCING PLANS OF GROUND EXCLUSIVELY BY PHOTOGRAPHIC MEANS
Filed Jan. 10, 1934    2 Sheets-Sheet 2
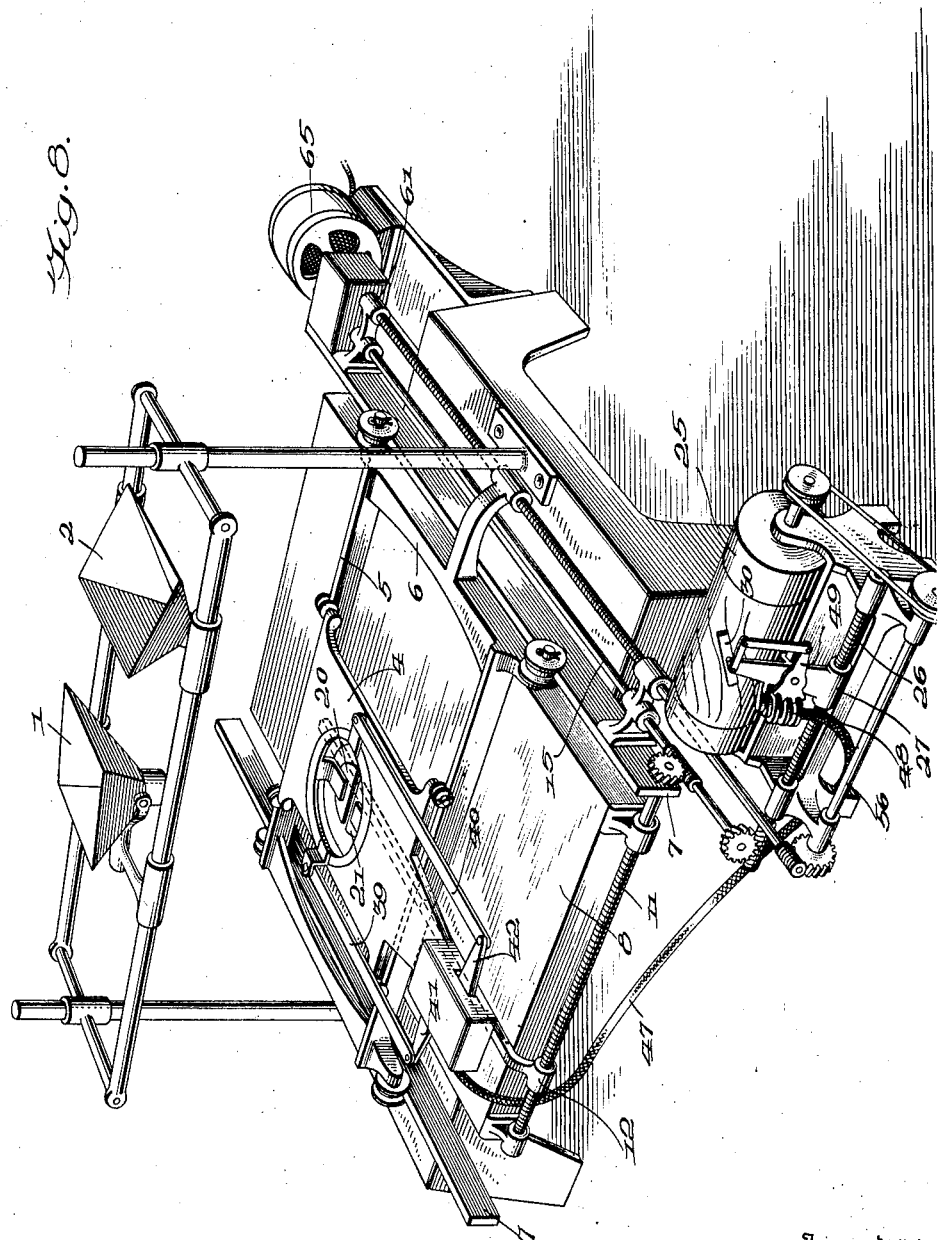
Inventor:
R. Ferber
By: Glascock Downing & Seebold
Attorneys.

Patented Nov. 3, 1936

2,059,633

UNITED STATES PATENT OFFICE 2,059,633

APPARATUS FOR PRODUCING PLANS OF GROUND EXCLUSIVELY BY PHOTOGRAPHIC MEANS

Robert Ferber, Courbevoie, France, assignor to the Society l'Aerotopographie, Courbevoie, France Application January 10, 1934, Serial No. 706,105
In France January 25, 1933

10 Claims. (Cl. 88—24)

The apparatus according to the present invention has for its object the production, by photographic means, of an exact topographic plan or map, that is, a complete orthogonal projection of the ground on a horizontal plane.

A photograph consists of a central projection of the ground on an inclined plane (termed "oblique" photograph) or on a horizontal plane (termed "vertical" photograph). Known rectifying apparatus are already employed for transforming an oblique photograph into a vertical photograph. The vertical or rectified photograph coincides with the orthogonal projection of the ground upon a horizontal plane, when the ground itself is flat and horizontal, but if it is desired to obtain, by means of a vertical photograph, an exact plan or map of ground showing differences of level, this photograph must be transformed by a graphic method, point by point.

It has been proposed a long time since (German Patent No. 222,386) to produce a photographic plan which eliminates all errors due to the differences of level of the ground, by projecting successively, on a photographic plate, the regions of the ground comprised between two curves representing the levels.

More recently, it has been proposed to make successive records of bands of the plan or map which are parallel to a fixed direction with reference to the apparatus employed, by the use of a slit which is displaced over a sensitive surface, upon which the image of the ground is projected by a chamber which is subject to vertical displacements corresponding to the variations of the altitude of the successive regions over which the said slot is moved.

Such methods require in the first place a previous knowledge of the differences of level of the ground, and, on the other hand, they will not afford exact results, as it is necessary to record each time a region having a certain width, while on the other hand this region comprises differences of level which give rise to defects in the matching of the details of the ground, between the adjacent regions. Such errors may be reduced to the minimum by diminishing the width of the regions, but by this means the number of such regions is increased, thus increasing the time required for the operation.

The present invention, due to the researches of Mr. Ferber, has for its object an apparatus for producing a photographic plan or map which is quite exact at all points, based upon the use of two photographic plates of the same ground which are taken from different points, and also upon the knowledge of certain data obtained by measurements made upon the ground, which may be reduced to a base-line and to the altitude of three points. This apparatus may be combined with the apparatus for photographic reconstitution as set forth in French Patent No. 664,881 dated November 30, 1928, for the reconstitution of the ground by means of the aforesaid factors, or may be combined with any other apparatus for photographic restitution employing, for instance, the direct view on a screen or the stereoscopic examination of the plates.

In conformity to the invention, a photographic record is made of the plan of a piece of ground by successive bands by projecting, upon a flat base covered with a sheet of photographic paper or the like, a plate contained in a chamber which has the same direction with reference to the said base, as the view-taking camera had with reference to the horizontal plane of the ground. A screen is employed, by which the light falls upon the photographic paper through a slit which is placed against the said base, and which may be displaced over the base in directions depending upon the form of the ground. The said slot has the form of a parallelogram whose shape may be changed, and two of its opposite sides, which are parallel to the direction of movement of the slit, have a length which is proportional to the rate of movement of the slit and to the time of exposure required; the other two sides may be varied in their direction. During the movement of the slit, the operator changes the distance between the chamber and the base-plate in proportion to the altitudes of the points of the ground whose image is recorded through the slit, which altitudes are supposed to be known or are estimated by a reconstituting apparatus. The successive displacements of the slit are assured in a given direction, for the whole or a part of the plan or map, and this direction is preferably the mean direction of the lines of maximum slope of the ground in the region examined. The width of each band, that is, the distance between the sides of the slit which are parallel to its direction of movement, may be regulated from one band to the next, according to the differences of level of the ground. The direction of the sides of the slit which are not parallel to the direction of movement is maintained approximately parallel to the lines of the level chart which are covered by the slip. In order that the time of exposure of the sensitive paper shall be the same at all points of the latter, the changes in the direction of the movable sides of the slit must take place with a certain time-difference, as will be further disclosed.

For the use of the invention with the apparatus for photographic reconstitution as set forth in French patent, No. 664,881, a certain number of modifications have been made in this apparatus, for the obtainment of an exact photographic plan in conformity to the invention, and in particular, the sensitive surface may be acted upon by a projection from one of the two chambers provided with the plates used for the reconstitution.

The invention can also be used with any apparatus adapted for reconstitution, by adding to such apparatus a third chamber provided with one of the two plates which serve for the reconstitution, or with a third plate similar to one of these two plates, and by the use of the projection from this plate in order to act upon the sensitive surface.

The accompanying drawings show by way of example a form of construction of the device, in case the invention is combined with the apparatus for photographic restitution as set forth in French Patent No. 664,881.

Fig. 1 is a diagrammatic view of the apparatus for photographic reconstitution whose principle is disclosed in French Patent No. 664,881.

Fig. 2 is an analogous view of the apparatus, showing the modifications enabling the use of the invention.

Fig. 3 is a view showing the arrangement of the adjustable slit.

Fig. 4 shows a complementary device for following the movements of the slit with reference to the level lines of the ground.

Figs. 5 and 6 relate to a special device for controlling the rotation of the two edges of the slit which are not parallel to its direction of movement.

Fig. 7 is an explanatory figure showing the method of dividing a plan into two parts, for which the movements of the slit take place in two different directions.

Fig. 8 is a perspective view of the complete device.

In the apparatus for photographic reconstitution which is shown in Fig. 1, 1 and 2 are the chambers carrying the photographic plates, which may occupy any position. A screen 3 is supported by a carriage 4 which is movable on horizontal rails 5 mounted on a second carriage 6 which is movable on horizontal rails 7, perpendicular to the rails 5.

It is observed that when the chambers 1 and 2 are placed in the same position which they occupied when taking the view, with reference to each other and to the horizontal plane in which the screen 3 is movable, the plan of the ground can be produced as will be further disclosed. The screen shows the double image of points of the ground, and this can be made single by suitably displacing the chambers vertically by means of any conventional construction such as a pedal controlling an electric motor which actuated the said chambers by a screw, not shown. At this time, the point of the ground represented by the image, is reconstituted. Its altitude is shown directly by a counter, and its horizontal projection can be drawn upon a sheet of paper placed upon a horizontal drawing board.

In order that the present apparatus may be employed for the obtainment of an exact photographic plan, in conformity to the invention, it must be given certain modifications, as indicated below. Under the carriage 4 (Fig. 2) is mounted a board 8 having a perfectly flat and horizontal surface, and the screen is replaced by an opaque plate 9 having a small horizontal slit, which is placed against the board 8. The additional optical systems are so adjusted that the image on the plane 8 will be sharp. The carriage 4 supporting the plate is movable upon the second carriage 6 by means of a screw 11 with which it is connected by a nut 12, having an extension 63 splined to the bottom of the carriage 4 so as to permit movement of the carriage 4 in one direction independently of the screw 11 as shown in Fig. 8, and the second carriage is movable on rails 7 by means of a screw 13 with which it is connected by a nut 14 or a nut 62 as shown in Fig. 8; thus the slit 10 can be moved in any direction above the board 8, by turning the shaft 15 and the screw 13. In Fig. 8 is also shown a bearing for shaft 15 secured to the base.

The plate having the slit may have the form represented in Fig. 3. Two opaque bands 16 and 17 are mounted in the same plane at a distance apart which can be regulated, their edges 18 and 19 being parallel and forming the sides of the slit parallel to the direction of movement. Two semicircular discs 20 and 21 are employed, whose straight edges are opposite one another and in the parallel position, and these edges form the sides of the slot which are not parallel to the direction of motion. The discs may be turned upon curved guides 22—23, in such way that they will rotate about their centers, which are spaced apart by a distance $d$ which can be adjusted by moving the guides 22—23 apart or together. The straight edges of the discs and the edges of the members 16—17 mark off the slit 10. The whole arrangement of the members 16—17—20—21—22—23 may be mounted on a disc 24, which is secured to the plate 9 and may be turned about its center so as to place the slit in any direction with reference to its supporting carriage 4. This direction will be so regulated that the sides 18 and 19 of the slit will be parallel to the direction of its displacement. It will be noted that the said slit consists of a parallelogram, in which one dimension $h$ or the distance between its sides parallel to its displacement, and the length of these sides, remain constant during one movement of the slit, whilst the angles vary. The distance $h$ is the width of a recorded band, and it may vary from one band to the next, whereas the length $d$ will remain proportional to the speed of displacement, the time during which each point of the sensitive surface is exposed will depend upon the ratio of this length to the speed. If the slit is moved at a constant speed, the distance $d$ should remain constant.

In order to obtain a photographic plan, the operation is as follows:

The two photographic plates are put in position in the known manner in the chambers 1 and 2 of the apparatus, which are directed as they were formerly; the plate 9 is also replaced by a screen, as shown in Fig. 1. The proper scale is used, or if necessary, a slightly different scale, in order to provide for any possible shrinkage of the support upon which the plan is formed. The arrangements are made for altitude, as disclosed in Patent, No. 664,881, making use of the altitudes of three points measured on the ground. The operator then produces the curves for the levels, drawing these curves for instance upon a sheet of paper mounted on the board 8, or on a drawing board which may replace it.

After this determination of the altitudes has been made, in a known manner, the operator observes the direction of the mean slope of the ground. The screen 3 is then replaced by the plate 9 carrying the disc 24, and this latter is then turned so as to make the edges of the members 16 and 17 parallel to the direction of this mean slope.

The sheet of paper already containing the level curves is mounted on a support, and the sheet is so arranged that the movements which are to be given to the slot 10 may be followed upon this sheet. For instance, it may be arranged as shown in Fig. 4, upon a drum 25 whose rotation is connected with the displacement of the slot 10, in such way that a forward movement $a$ of the carriage 6 will correspond to a rotation $$\frac{a.360°}{D.\pi}$$

of the drum 25, D being the diameter of the drum. A screw 26 is mounted parallel with the drum and in front of the latter, and upon the screw is movable a nut 27 connected with a member 28 which is slidable in a direction parallel with the screw 26 and carries a pointer 29 in contact with the drum. The rotation of the screw 26 is connected with the rotation of the shaft 15, and thus a displacement of the slit parallel to the rails 5 will afford the same displacement of the pointer 29 along the drum 25.

When placing the sheet of level curves upon the drum, it is necessary to mount it so that the point adjacent the pointer 29 will correspond to the image which is formed at the center of the slit 10.

The shaft 15 and the screw 13 are connected together with a suitable speed reduction ratio, for instance by gear wheels indicated by the gear box 60 in Fig. 8, in order that they may be driven at the same time by an electric motor or by hand, and the resulting rotation of the screws causes a displacement of the slit in a constant direction which is that of the mean slope of the ground, to which the edges of the members 16—17 forming the slit 10 have been made parallel.

When the pointer moves over the drum, it is necessary that the operator should know the amount of displacement to be given to the pedal regulating the height of the chambers, in order that the height of these latter may correspond at each instant to the curves of level encountered. By way of example, Fig. 4 shows a counter 54 which is mounted on the support of the pointer and is connected with the movement of the chambers; it has for instance a graduation whose divisions correspond, for each scale of operating, to equal distances on the level curves. As the dials in use will depend upon the scale of operating, such dials are preferably interchangeable. With a counter of this kind, the operator will act upon the pedal, during the movements of the pointer, in such way that the figures shown by the counter will correspond at each instant to the height of the level curves which move under the pointer.

A ruler 30 is mounted on the pointer 29 and in contact with the drum; said ruler is pivoted to the upper end of the pointer, and the operator takes care, during the displacement of the pointer along the drum, to keep the ruler practically parallel to the level curves which are successively intersected.

The said ruler is suitably connected with the two discs 20—21, in such way that these will follow its various movements. In this manner, the slot, during its movements, will be directed according to the tangent to the level curves of the points of the ground over which it moves successively.

The operator places a sheet of sensitive paper on the board 8, lights one of the chambers 1—2, and moves the slit 10 by turning the shaft 15 and the screw in a continuous and uniform manner; he then places the chambers at heights corresponding to those of the level curves which are successively encountered, and keeps the small ruler parallel with the level curves during the movement. This will produce a photographic record upon the sensitive surface, representing an exact orthogonal projection, at all points, of the ground over which the slit is moved.

After making one band having a width $h$, the slit will be moved over a contiguous band having a width $h'$, by moving the plate 9 laterally, by a length of $$\frac{h+h'}{2}$$

which movement may be effected for instance by a suitable movement of the screw 13 and the shaft 15. In this manner, all the points of the ground will be covered in parallel bands.

The slit is directed according to the tangent to the level curves which are successively encountered. If these curves have a very small radius of curvature, all points of the slit will not be exactly at the same altitude, but in such cases the length $h$ may be reduced.

For all the successive directions of the slit, it is observed that the width $h$ of a band which is covered will remain the same, and that of the plate 9 has a uniform motion, the time of exposure will remain constant, since the distance $d$ is not changed. Such is not the case during the changes of direction of the slit. If the latter turns for instance in the counter-clockwise direction, and if the plate moves upwardly over the sheet (Fig. 3), the whole portion of the slit which is situated to the right will move more rapidly over the ground than the part situated to the left. For this reason, there will be an over-exposure on the left-hand side of the band, and an under-exposure on the right. This drawback can be readily obviated by suitably moving the discs 20—21 with reference to the time. If $v$ is the speed of motion of the screw 13 over the sensitive paper, the time of exposure should remain, at all points, constant and equal to $$\frac{d}{v}$$

Hence the disc 21 should rotate at the same rate as the disc 20, but with a time-difference of $$\frac{d}{v}$$

Figs. 5 and 6 show by way of example a device for obtaining the proper time-difference between the rotations of the two edges of the slit, as well as the synchronism between the rotation of the slit and the rotation of the small ruler. The movements of rotation of the respective discs 20 and 21 about their centers in the guides 22 and 23 are controlled by two star-wheels 31 and 32, which may be acted upon by rods 33 which are slidable in the rim of a wheel 34. The movement of said rods into the interior of the wheel is controlled by a fixed ramp 35 situated opposite the wheels 31—32; the rods are brought out of the wheel, as desired, by a member 36 mounted within the wheel 34 and near the wheels 31—32. In order to turn the slit 10, that is, the discs 20 and 21, the operator acts for a longer or shorter time upon the member 36, thus bringing out a greater or less number of the rods; these latter will first rotate the wheel 31 and then the wheel 32, with a constant time-difference, provided the speed of the wheel 34 is constant, and this speed is regulated in such way that this time-difference will have the value above mentioned. The two discs 20—21 are provided with arms 37—38 to which are pivoted the links 39—40, respectively, and the pivoting points are in line with the straight parts of the respective discs. The links 39—40 are pivoted at their other ends to members 41—42 pivoting about the points A—A' and carrying worm-wheels 43—44, respectively; said wheels are driven by worms 45—46 mounted on the shafts of respective wheels 31—33. The members 31, 45 and 43 are similar to the respective members 32, 46 and 44. If O and O' are the respective centers of the discs 20 and 21, if B and B' are the pivoting points of the links 39 and 40 upon the arms 41 and 42, respectively, and if C and C' are the pivoting points of these arms upon the arms 37 and 38, OC is parallel to AB, and O'C' is parallel to A'B'; on the other hand, OC=AB, and O'C'=A'B'; again, OC is parallel to O'C' in the inoperative position. The wheel 34 is enabled to rotate as the carriage 2 advances, by means of a connection between the said carriage and wheel, which is made by a rack or like device, not shown; the wheel 34 will rotate at a uniform rate in the direction of the arrow, and hence it turns the wheels 31—32 with a time-difference which may be suitably regulated, as above disclosed. In order to bring the slit to its initial position, or to turn it in the other direction, it is simply necessary to interrupt the shafts connecting the respective wheels 31—32 with the worms 45—46 and to employ two sets of gear-wheels which provide for the direct action of the device, or for reverse motion. On the end of the shaft of the worm 45 may be mounted a flexible shaft 47 whose other end is coupled to a worm 48 adapted to drive a worm-wheel member 49 pivoted at D and carrying an arm 50 to whose end E is pivoted a link 51 which is pivoted at its other end at G to a lever 52 pivoting at F and actuating the ruler 30. The members 48, 49, 50, 51, 52 are mounted on the support carrying the pointer which is in contact with drum 25; said pointer is provided with a small indicating mark 53 placed on the ruler 30. If the parts FG and DE are equal and parallel, and if the speed-ratios of the several worms and worm-wheels have the proper values, the degree of rotation of the ruler 30 and of the edges of the slit will be equal.

The device shown in Figs. 5 and 6 only provides for a constant rate of rotation of the slit, and it is only possible to obtain slower mean rates of rotation, by operating by jerks, but this is quite sufficient, as the parallel conditions for the slit and the level curves can only be realized to an approximate degree.

The whole operation as above disclosed will thus comprise two steps, firstly the recording of the altitude and secondly the exposure of the sensitive surface.

It has been stated by way of example that the altitudes can be recorded by drawing the level curves, but such curves may be directly recorded upon a sheet of paper which is placed at the start upon the drum 25, the screen being moved by the screw 13 and the shaft 15. It is also feasible to draw the level curves on a larger or smaller scale than that of the plan to be reconstituted, taking due account of the difference in the scale by using a greater or less speed-ratio between the screw 26 and the shaft 15; and between the drum 5 and the screw 13. The level curves may further be obtained by the use of successive profiles which are recorded in any suitable manner. In the case of an unknown ground, it is preferable to use the level curves in order to observe the mean slope on which the slit is to be displaced.

If the ground to be reconstituted in any operation comprises a mountain spur or a rounded hill, it will not be possible to find a direction of displacement for the slit which will not be, in certain places, practically parallel with the level curves. In this case, the operation may be performed in two or more steps, by dividing the ground into two or more parts, selecting for each part a mean direction of the lines of the greatest slope. Fig. 7 shows the plan of such ground, represented by its level curves. This ground may be divided into two parts by the line AB, and the mean directions of the lines of greatest slope are shown at $D_1$ and $D_2$. The direction $D_1$ is suitable for displacing the slit for the whole of the part situated to the left of the line AB; on the contrary, the direction $D_2$ is preferable for the part situated to the right. The operator will thus place upon the sensitive surface an opaque sheet, bounded by the line AB, which covers the whole of the right-hand part of the ground, and he will operate as if only the left-hand part existed; he then continues the operation for the right-hand part, placing the opaque sheet to the left of AB, taking care, by means of suitable indicating marks, that in both operations the edge exactly coincides with the line AB, in order to avoid any breach of continuity in the photograph.

In the case, for instance, in which the form of the ground is approximately known, and in which the ground does not comprise any considerable irregularities, it is feasible, if planimetry alone is to be used for the plan, to produce the photographic plan in a single operation. The slot will thus be moved approximately in the direction of the known slope, using a suitable screen in the rear of one of the photographic plates in order that the light from the corresponding chamber will have no effect; the light from the other chamber, on the contrary, may act upon the sensitive surface. The slit may then be displaced, while at the same time constantly regulating the height of the chambers as the slit moves, in order that the images shall not be doubled at any of its points.

In the preceding description with references to the accompanying drawings, it is supposed that the plan is reconstituted by means of a device resembling the one disclosed in applicant's French Patent No. 664,881, but as above indicated, the invention is applicable to all other apparatus for reconstituting plans by the use of direct sight upon a screen, or by a stereoscopic examination of the plates. Such an apparatus usually comprises two chambers containing the plates for the ground to be reconstituted, and it employs a tracing arrangement consisting of two carriages moving at right-angles, actuated by screws adapted for the displacement, above a flat base upon which a sheet of paper adapted for the tracing of the plan is mounted, a lead-pencil or a pointed rod, and the displacements of a sight vane which are brought into coincidence with the different points of the ground are connected with the displacement of the pencil, and the latter thus traces the horizontal projection to the desired scale.

A second system provides for the altitudes of the points of the ground, and such altitudes are usually indicated by a counter.

For the use of the invention with a reconstituting apparatus of this kind, the apparatus is provided with a third chamber which is similar to the view-taking camera, adding to this an optical system analogous to the one employed in the apparatus shown in the drawings. This third chamber is directed upon a flat surface in the same manner as one of the view-taking cameras was directed upon the horizontal plane of the ground, and its distance from this surface may be varied by means of a suitable set of guides, together with a screw connected with the device showing the variations of altitude of the ground in the reconstituting apparatus upon the flat surface is laid a sheet of sensitive paper, and above it is an arrangement of carriages moving at right-angles, upon which is mounted a disc having a slit as above disclosed. The arrangement of carriages may be actuated by a rod and a screw serving the same purpose as the rod 15 and the screw 13, and it provides for the recording of a photographed plan, by connecting the said rod and screw with the mechanism of the reconstituting apparatus which displaces the tracing pencil. This connection is such that the slit will have the same movements as the tracing arrangement has at the same time, or which the latter would have had, in case it is eliminated.

The projection chamber, the auxiliary optical system, the flat surface, and the arrangement of carriages for the displacement of the slit, form a device similar to the apparatus shown in the drawings and above described, one of the chambers being supposed to be removed.

It is evident that the invention can also be used with the apparatus described in French patent, No. 664,881, by adding a third chamber and by operating as above disclosed.

The said device comprising an auxiliary projection chamber may be employed as follows. The plates are placed in chambers of the reconstituting apparatus, and the chambers are given the proper direction. The scale of the reconstitution is found according to a known method, and the level curves may be drawn in the usual manner. The direction of one of the two chambers is thus well determined with reference to the horizontal plane of the ground, and the aforesaid auxiliary chamber is directed in like manner upon the flat surface covered by the sensitive sheet. The operator places in this auxiliary chamber a third plate which is similar to the plate in the chamber having the same direction, and is obtained by any photographic reproduction. If the level curves have been drawn beforehand, the original plate itself can be thus placed. The controls of the carriages are then connected, for instance by gearing, in such way as to displace the slit in directions depending upon the slope of the ground, and the operator acts upon the device controlling the height of the chambers and also upon a ruler controlling the variations of the direction of the slit, in exactly the same manner as for the apparatus above described and shown in the drawings.

It is also feasible to dispense with the preliminary drawing of the level curves, and to execute the whole of the photographic work of the planimetary in a single operation, by regulating the vertical movements of the third chamber by a direct determination of the altitudes in the reconstituting apparatus, and by suitably directing the slot by a direct estimation of the direction of the level lines. In this case, it is necessary to employ a third plate.

I claim:

1. A mechanical and optical device, for making photographic records of the plan of any ground, comprising a projecting chamber, a plate placed in said chamber, a base-plate, a sheet covering said plate and having a layer which is sensitive to light, a screen having a slit and mounted adjacent to said base-plate, means for suitably directing and displacing said chamber with reference to said screen, means for giving to said slit successive displacements in determined directions, said slit having the shape of a deformable parallelogram, whose two opposite sides, parallel to the direction of displacement of the slit, have a length proportional to the speed of displacement and are at a constant distance apart with reference to a given recorded band.

2. A mechanical and optical device as claimed in claim 1, in which the displacement of the slit takes place, for a series of bands forming the plan, in a mean direction of the lines of maximum slope in the region considered.

3. A mechanical and optical device as claimed in claim 1, having means for regulating the distance between the two sides of the slit, in the direction parallel to its displacement, according to the differences of level of the ground.

4. A mechanical and optical device as claimed in claim 1, comprising means for adjusting the length of the small sides of the slit, and correlating connections between said means and the means for producing displacement of the slit.

5. A mechanical and optical device as claimed in claim 1, comprising a drum or disk, situated on the machine and carrying a record of the level curves for the ground, a pointer closely adjacent the surface of said drum, means connecting said pointer to the parts forming the sides of the slit, whereby the movements of the pointer and said parts are correlated.

6. A mechanical and optical device as claimed in claim 1, comprising a drum or disk, situated on the machine and carrying a record of the level curves for the ground, a pointer closely adjacent the surface of said drum having a ruler pivotally mounted near the apex thereof, and connections between said ruler and the parts forming the sides of said slit whereby the edges of the slit move correspondingly to the movements of the ruler.

7. An apparatus comprising a mechanical and optical device as claimed in claim 1, a reconstituting apparatus associated therewith, means controlling the heights of the reconstituting apparatus and the displacement of the chamber, a drum bearing a record of the level curves of the ground, an indicating mark, and means moving said indicating mark over said record, means producing displacement of the slit and connections between said two last-named means.

8. An apparatus as claimed in claim 1 in which means are provided for moving the screen in different directions, a drum having level curves outlined thereon, a pointer indicating said curves, and connections between said pointer and said moving means whereby the direction of the movement of the slit in relation to the level curves is clearly indicated.

9. A mechanical and optical device as claimed in claim 1, comprising a ground plan having level lines outlining bands, means for producing displacements of the slit along a band, means for altering the direction of the sides of the slit not parallel to the direction of displacement and connections between said means for maintaining the said sides of the slit parallel to the level lines and the width of the slit constant.

10. A mechanical and optical device as claimed in claim 1 comprising a drum having level lines outlining bands thereon, a pointer having a ruler for indicating changes of direction in said lines, means for displacing said slit and means for rotating each side of said slit and connections between said ruler and each of said means for causing said sides to rotate with a difference in time whereby the exposure of all points of the sensitive sheet is the same.

ROBERT FERBER.